(12) United States Patent
Baigh (10) Patent No.: US 12,502,909 B2
(45) Date of Patent: Dec. 23, 2025

(54) VEHICLE WHEEL BLADE ASSEMBLY

(71) Applicant: Chet Baigh, Chicago, IL (US)

(72) Inventor: Chet Baigh, Chicago, IL (US)

( * ) Notice: Subject to any disclaimer, the term of this patent is extended or adjusted under 35 U.S.C. 154(b) by 423 days.

(21) Appl. No.: 18/186,110

(22) Filed: Mar. 17, 2023

(65) Prior Publication Data

US 2023/0226847 A1 Jul. 20, 2023

Related U.S. Application Data

(63) Continuation-in-part of application No. 16/735,623, filed on Jan. 6, 2020, now abandoned.

(51) Int. Cl.
| | | |
|---|---|---|
| *B60B 7/06* | (2006.01) | |
| *B60B 7/20* | (2006.01) | |
| *B60T 5/00* | (2006.01) | |
| *F04D 19/00* | (2006.01) | |
| *F04D 29/36* | (2006.01) | |
| *F04D 29/38* | (2006.01) | |

(52) U.S. Cl.
CPC ............. *B60B 7/068* (2013.01); *B60B 7/20* (2013.01); *B60T 5/00* (2013.01); *B60B 2900/513* (2013.01); *F04D 19/002* (2013.01); *F04D 29/366* (2013.01); *F04D 29/384* (2013.01); *F04D 29/388* (2013.01); *F05D 2240/307* (2013.01)

(58) Field of Classification Search
CPC ......... B60T 5/00; B60B 7/0086; B60B 7/068; B60B 7/20; B60B 19/10; F04D 29/24; F04D 29/242; F04D 29/281; F04D 29/30; F04D 29/34; F04D 29/366; F04D 29/388; F16D 65/128
See application file for complete search history.

(56) References Cited

U.S. PATENT DOCUMENTS

| | | | | |
|---|---|---|---|---|
| 4,593,953 | A * | 6/1986 | Baba | B60B 7/0086 301/6.3 |
| 5,503,465 | A | 4/1996 | Price et al. | |
| 7,097,730 | B2 * | 8/2006 | Woelfel | B60B 7/18 301/37.11 |
| 7,806,485 | B1 * | 10/2010 | Nelson | B60B 7/04 301/37.109 |
| 9,561,687 | B2 | 2/2017 | Polka | |
| 9,919,555 | B2 * | 3/2018 | Wippler | B60B 7/0086 |
| 10,821,776 | B1 * | 11/2020 | Labadie | B60B 19/10 |
| 11,077,707 | B2 | 8/2021 | Wong et al. | |
| 11,220,132 | B2 | 1/2022 | Butler et al. | |
| 2008/0036285 | A1 * | 2/2008 | Davis | B60B 19/10 301/37.25 |
| 2009/0167074 | A1 * | 7/2009 | De Lima | B60B 7/16 411/96 |

(Continued)

FOREIGN PATENT DOCUMENTS

| | | | |
|---|---|---|---|
| DE | 102016004129 | 9/2016 | |
| WO | WO-2011128037 A1 * | 10/2011 | ............. B60B 19/10 |
| WO | 2022123129 | 6/2022 | |

*Primary Examiner* — Jason R Bellinger
(74) *Attorney, Agent, or Firm* — LeFevour Law, LLC; Martin LeFevour (57) ABSTRACT

Vehicle wheel attachments that are installed and removed easily and are capable of being individually removed and adjusted. These vehicle wheel attachments direct airflow out of the interior of the wheel well.

12 Claims, 11 Drawing Sheets

(56) References Cited

U.S. PATENT DOCUMENTS

2009/0195053 A1* 8/2009 Kruse .................. B60B 7/0053
                                                      301/6.4
2017/0157979 A1   6/2017 Polka et al.
2021/0206199 A1* 7/2021 Baigh .................. F04D 29/388

* cited by examiner

VEHICLE WHEEL BLADE ASSEMBLY

PRIORITY DATA

This application claims priority from the following US patent application: this application is a continuation-in-part of U.S. application Ser. No. 16/735,623, filed Jan. 6, 2020, now abandoned. The above application is incorporated herein by reference in its entirety; the disclosure of which is incorporated herein in its entirety.

BACKGROUND

Wheel attachments have been used on automobile wheels to reduce the air pressure build up in the wheel well by designing air diverters on the attachment that direct airflow out of the interior of the wheel well. These prior attachments, though, are typically one assembly that is attached to the wheel, with all of the air diverters attached to one another and not capable of individual adjustment or, if they are individual air diverters, they are difficult to remove from the wheel or not capable of being individually adjusted.

Accordingly, there is a need for vehicle wheel attachments that direct airflow out of the interior of the wheel well, that can be installed and removed easily and are capable of being individually removed and adjusted.

SUMMARY

According to one aspect of the present invention, a blade assembly for connection to a vehicle wheel may include a single aerodynamic blade; and a connection assembly, where the connection assembly connects the single aerodynamic blade to the vehicle wheel. According to another aspect of the present invention, the connection assembly may include a fastening bolt, a beveled washer and an open-ended lug nut having two opposing ends that connect the single aerodynamic blade to an individual lug nut bolt of the vehicle wheel, and according to another aspect of the present invention, the connection assembly may include an adhesive glue.

According to another aspect of the present invention, a plurality of blade assemblies for connection to a corresponding plurality of lug nut bolts of a vehicle wheel, where each blade assembly may include a blade defining a hole; a connection assembly, including a fastening bolt, a beveled washer and an open-ended lug nut having two opposing ends, where, in use, one end of the open-ended lug nut is fastened to a lug nut bolt of the vehicle wheel; and where the fastening bolt passes through the beveled washer and the hole in the blade and engages the opposing end of the open-ended lug nut to fasten the blade to the vehicle wheel. According to another aspect of the present invention, each blade may include an embossed dial thereon to align the beveled washer and a plateau formed thereon to disperse compressive forces. Further, the beveled washer may be adjusted for each blade to set each blade at an individual desired angle.

According to another aspect of the present invention, each blade may further include a blade portion; a hinge; an aileron, a movement means; a pushrod and a linkage, where the blade portion is hinged to the aileron and the movement means is connected to the blade portion and the linkage is connected to the aileron; and where the movement means is connected to the linkage to move the aileron relative to the blade portion when the movement means is activated.

According to another aspect of the present invention, each blade may further include a blade portion; a hinge; a blade portion; an aileron: a mechanical servo; a pushrod; and a linkage, where the blade portion is hinged to the aileron and the mechanical servo is connected to the blade portion and the linkage is connected to the aileron; and where the mechanical servo is connected to the linkage to move the aileron relative to the blade portion when the mechanical servo is activated.

According to another aspect of the present invention, each blade may further include a blade portion; an anchor portion defining a hole; a servo connected to the anchor; a gear set connected to the anchor and the servo; and a rotational column connected to and extending from the gear set into the blade portion; where when the servo is activated, the servo moves the gear set, which rotates the blade portion. According to a further aspect of the present invention, each blade may include a leverage stalk and a centrifugal weight connected thereto. According to a yet further aspect of the present invention, each blade may substantially be a flat airfoil; may include a joint or may include a wingtip device.

DRAWINGS

Objects, features, and advantages of the present invention will become apparent upon reading the following description in conjunction with the drawing figures, in which.

DESCRIPTION

Figure 1:
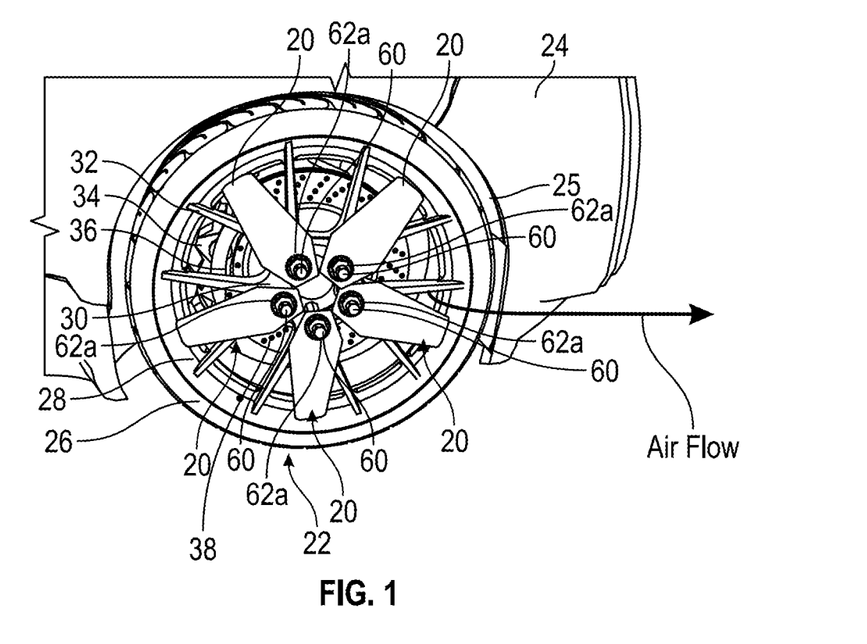
FIG. 1 is a side view of an automobile wheel disposed in a wheel well with blade assemblies of an embodiment of the present invention affixed to the wheel.
Figure 2:
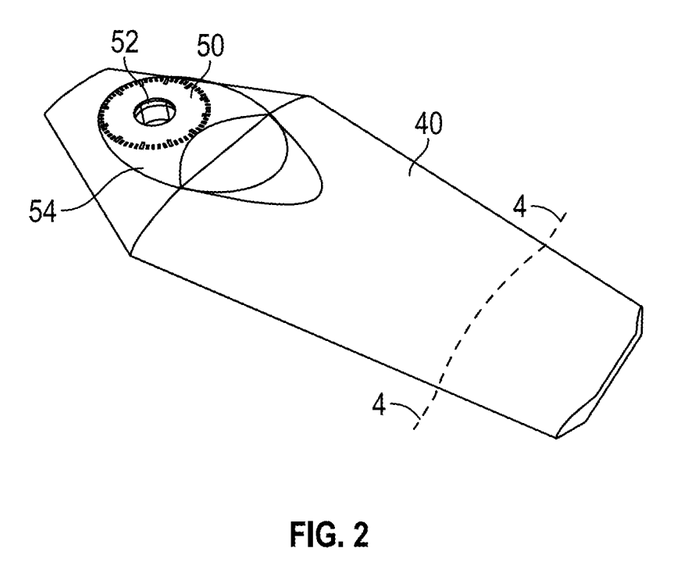
FIG. 2 is a top perspective view of an embodiment of a blade of a blade assembly of the present invention.
Figure 3:
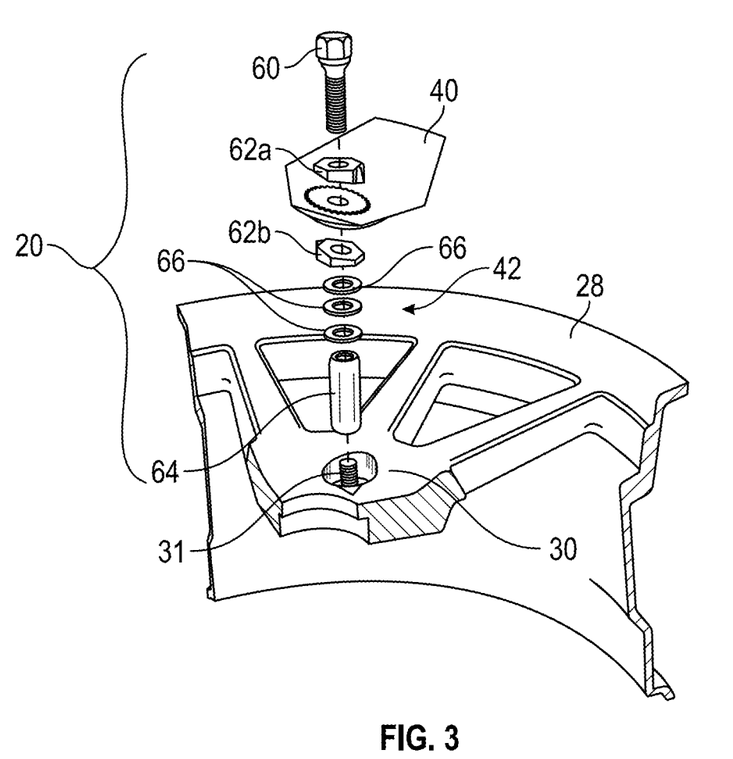
FIG. 3 is an exploded view of an embodiment of a connection of a blade assembly of the present invention to the automobile wheel.

Referring to FIG. 1, an embodiment of blade assemblies 20 of the present invention are depicted affixed to a wheel 22 of an automobile 24. It should be understood that present invention could be used on the wheel 22 of any vehicle, not just an automobile. The wheel 22 is disposed in a wheel well 25 of the automobile and is a known automobile wheel 22 having a tire 26 mounted on a rim 28, a hub 30 having several lug nut bolts 31 (FIG. 3), spokes 32 and a brake assembly 34 having a caliper 36 and a rotor 38. Referring now to FIG. 2-3 as well, each blade assembly 20 includes a blade 40 and a connection assembly 42. In one embodiment, as depicted in FIG. 2, the blade 40 has a dial 50 embossed thereon and a hole 52 formed therein to receive a fastening bolt 60. The blade 40, in this embodiment, also has a plateau 54 formed on a top surface of the blade 40. The plateau 54 may be formed into the structure of the blade 40 or be made as a separate piece that interacts with the blade 40. It should be understood that that the dial 50 and the plateau 54 are optional and do not need to be present in every embodiment. Further, it should be understood, in other embodiments, that the blade 40 can be formed as flat on both sides to form, essentially, a fan-blade configuration.

In one embodiment, to connect the blade 40 to the hub 30 of the wheel 22, the connection assembly 42 depicted in FIG. 3 may be used. The connection assembly 42 of this embodiment includes a fastening bolt 60, a pair of beveled washers 62a, 62b and an open-ended lug nut 64. The beveled washers 62a, 62b may be made in various shapes and sizes. The connection assembly 42 may also include one or more flat washers 66. The flat washers 66 may be used to adjust the height of the blades 40 to clear the height of various parts of the rim 28. To connect a blade 40 of the blade assembly 20 to a wheel 22, a user threads one end of the open-ended lug nut 64 onto the lug nut bolt 31. In this embodiment, the user then places the flat washers 66, the one beveled washer 62b, the blade 40, the other beveled washer 62a into position and slides the bolt 60 through the holes in all of these pieces and then screws the bolt 60 into the open end of the open-ended lug nut 64 until the blade 40 is secure. The flat washers 66 can placed anywhere where needed within the connection assembly 42. Also, it is important to note, that in this embodiment, when the beveled washers 62a, 62b are positioned, the user rotates them until the user gets the blade 40 at the angle the user desires. The angle that the blade 40 is placed at can be based on a number of factors, such as the degree that the user wants the blades 40 to be at to create a certain amount airflow at a certain rate from the wheel hub 30; a style preference of the user or to account for, and clear, the structure of the rim 28. When positioning the beveled washers 62a, 62b, the user may use the dial 50 on the blade 40 to ensure he has the beveled washers 62a, 62b in the correct position for the angle he is setting the blade 40 at. Furthermore, in this embodiment, the plateau 54, when the bolt 60 is being tightened, acts to disperse the compressive force between the bolt 60 and the open-ended lug nut 64 to aid in keeping the blade 40 from cracking during the process of the securing the blade assembly 20 to the wheel 22.

Referring now to FIG. 1, the user has secured the blade assemblies 40 in place on the wheel 22 by connecting each blade 40 individually to a lug nut bolt 31 in the hub 30 of the wheel 22. The user, by adjusting the beveled washers 62a, 62b, has set each blade 40 at the angle the user desires. It should be noted that since each blade 40 is a separate, individual blade 40, that is not connected to every other blade 40 on the wheel 22, the user can set each blade 40 at different angles if he desires. The blades 40 do not have to all be set at the same angle as they would need to be in a system where each blade was connected to the other. In operation, a user puts the automobile 24 in motion, the interior of the wheel well 25 forms a parachute-like shape causing parasitic drag as a buildup of air pressure. The blades 40, now rotating since they are connected to the moving wheel 22, act as fan blades or a propeller to extract air, as indicated by the arrow in FIG. 1, from the interior of the wheel well 25 exterior of the wheel 22. As a result, there is less air pressure in the wheel well 25, which lessens drag.

Further, the air extraction, that the rotating blades 40 causes, also cools the caliper 34 and the rotor 38 of the brake assembly 34, helping aid superior braking performance and part longevity.

Figure 4:
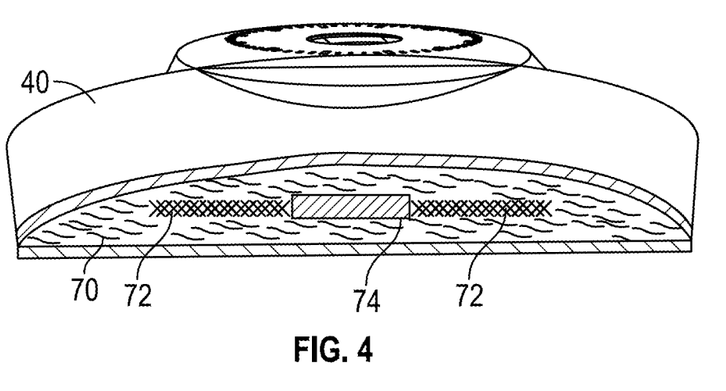
FIG. 4 is a cross-sectional view along line 4-4 of FIG. 2.

Referring to FIG. 4, the internal compositions of an embodiment of a blade 40 of a blade assembly 20 are depicted. While someone of ordinary skill in the art understands that a single construction material may be used, in this embodiment, the blade 40 includes several internal reinforcement structures 70, 72, 74 which improve the performance of the blade 40. The reinforcement structures 70, 72, 74 may add supplementary material traits, such as strength, flexibility, dampening, reduce brittleness, reduce resonant vibrations, filling intricate details, increase lifespan, reduce torsion or other benefits. The material 70 represents the bulk of the internal mass in this embodiment and is made of carbon fiber. In other embodiments, the material 70 may be made from any fibrous material such as recycled fibrous paper currency. One or more inner layers 72 may be made of other materials, such as a metal mesh screen, Kevlar® brand heat-resistant para-aramid synthetic fiber, aramid, hybrid or any other material which exhibits supplementary structural traits. Further, one or more supplementary cores 74 may add beneficial traits. A core 74 may be made of fiberglass, metal, plastic or any other material differing from the outer material 70 and any other differing reinforcement material 72.

FIGS. 5-9 depict various embodiments of blade assemblies of the present invention. In the embodiment depicted in FIG. 5, the blade 40 of the blade assembly 20 includes a blade portion 81 and an aileron 88, which are hinged 83 to each other so the aileron 88 can be moved up and as depicted by the arrows. This embodiment incorporates a mechanical servo housing 80, a pushrod or pull rod 82, an axle-like linkage 86 connected to its counterpart axle-like linkage 84, which is connected to the aileron 83. As the servo housing 80 pushes and pulls the rod 82, the aileron 83 moves proportionally. The servo housing 80 may consist of a geared servo motor or a hydraulic ram. This servo housing 80 may be controlled by an onboard computer system, a mobile device, accelerometer gravitational force sensors, along with any other sensors and or devices and may be powered or communicate using electrical wiring, adjacent batteries, Bluetooth, radio signals or any other viable method.

Figure 5:
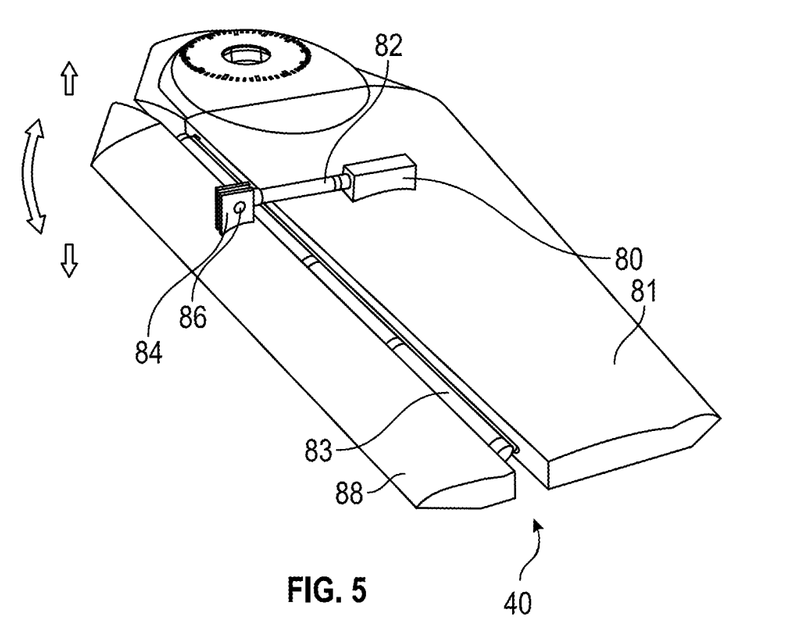
FIG. 5 is a top perspective view of another embodiment of a blade of a blade assembly of the present invention.
Figure 6:
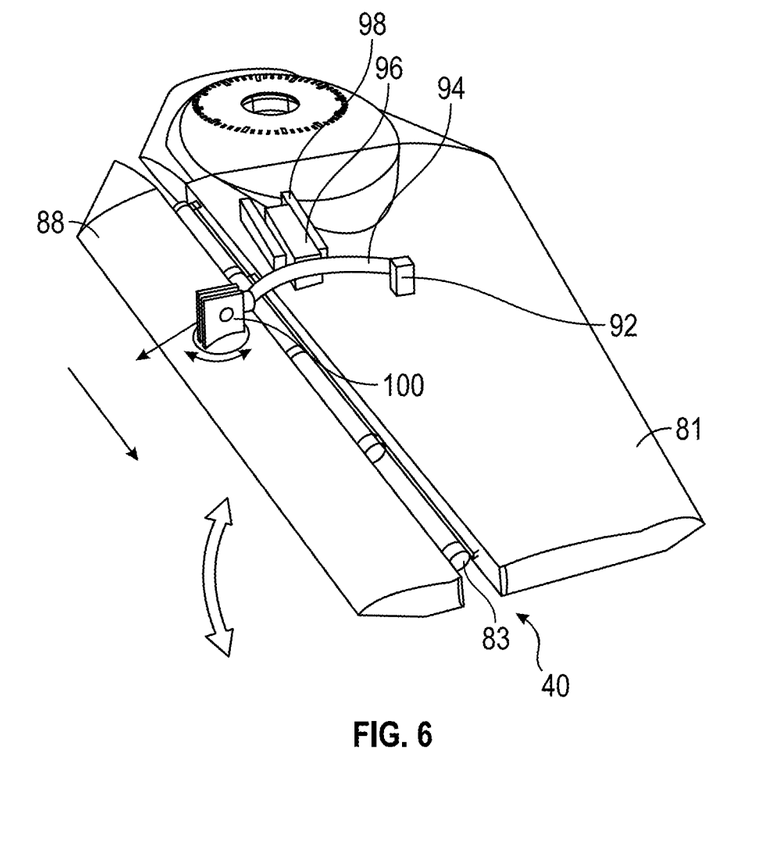
FIG. 6 is a top perspective view of another embodiment of a blade of a blade assembly of the present invention.

In the embodiment depicted in FIG. 6, similar to the embodiment in FIG. 5, the blade 40 of the blade assembly 20 includes a blade portion 81 and an aileron 88, which are hinged 83 to each other so the aileron 88 can be moved up and as depicted by the arrows. In this embodiment, a centrifugal servo arm 94 is anchored to the blade portion 81 at an anchor 92. In this embodiment, the servo arm 94 is bendable and may be made of spring steel or a composite. The servo arm 94 is pressed upon by a free-moving centrifugal weight 96 which resides within a guide path housing 98. In this embodiment, as the RPM's of the wheel 22 increase, the centrifugal weight 96 presses on the curved arm 94 causing the curved arm 94 to extend into an aileron linkage 100, which may also rotate along the plane of the aileron. The straightening of the centrifugal arm 94 causes it to extend away from the anchor 64 causing movement of the hinged aileron 88. When the RPM's of the wheel 22 decrease, the inherent spring of the centrifugal arm 94 retracts to its more curved, idle geometry and pushes the weight 96 back into the guide housing 98. This action pulls on the aileron linkage 100, causing the aileron 88 to return to its original position.

Figure 7:
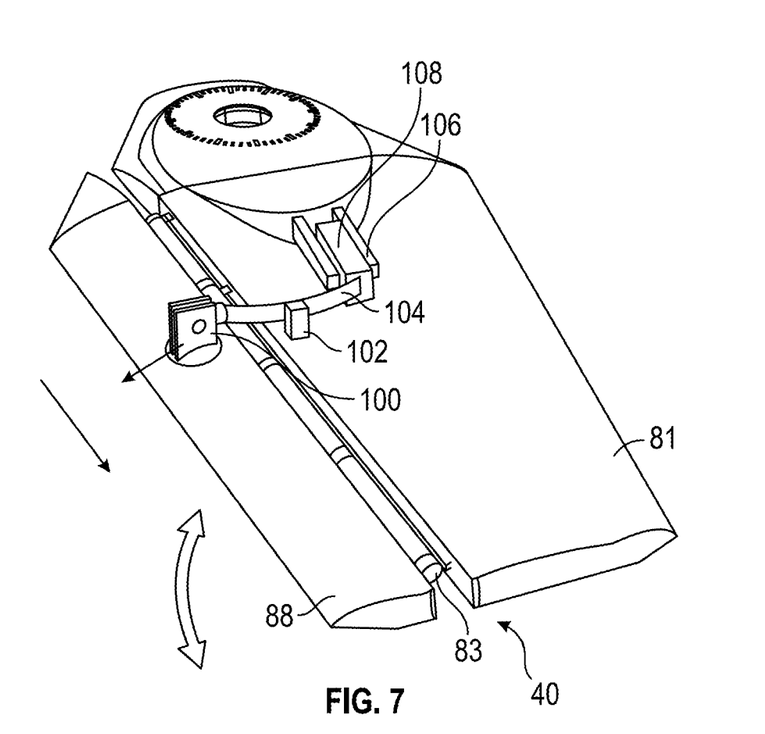
FIG. 7 is a top perspective view of another embodiment of a blade of a blade assembly of the present invention.

The embodiment illustrated in FIG. 7 depicts a blade assembly 20 with a hinged aileron 88 which uses a weight 108 which is free to move in the direction of the centrifugal force within a guide path housing 106. The centrifugal force free-moving weight 108 presses with incremental force upon one end of the centrifugal arm 104, made of spring steel in this embodiment. The centrifugal arm 106 may be bendable or solid. The centrifugal arm 106 is anchored at one or more arc crest anchor points 102. When the wheel 22 rotates faster, the centrifugal force increases causing the weight 108 to move away from the hub 30 along the guide path housing 106, pushing the arm 104 into the aileron linkage 100 causing the aileron 88 to tilt.

Figure 8:
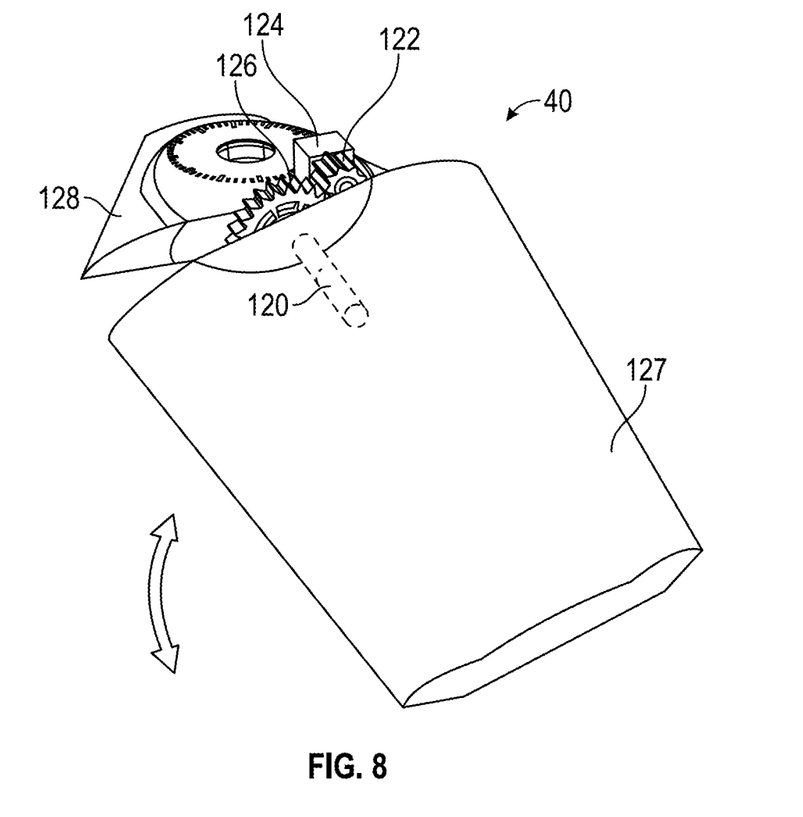
FIG. 8 is a top perspective view of another embodiment of a blade of a blade assembly of the present invention.

In the embodiment depicted in FIG. 8, the blade 40 is split into the blade portion 127 and an anchor portion 128, which is the portion of the blade 40 that connects to the hub 30 of the wheel 22. The blade portion 127 has a rotational column 120 set within in it. The rotational column 120, in this embodiment, is rotated by a large gear 126 which is rotated by a smaller gear 122, connected to a servo 124. This arrangement allows the blade portion 127 to moved in the directions indicated by the arrows.

Figure 9:
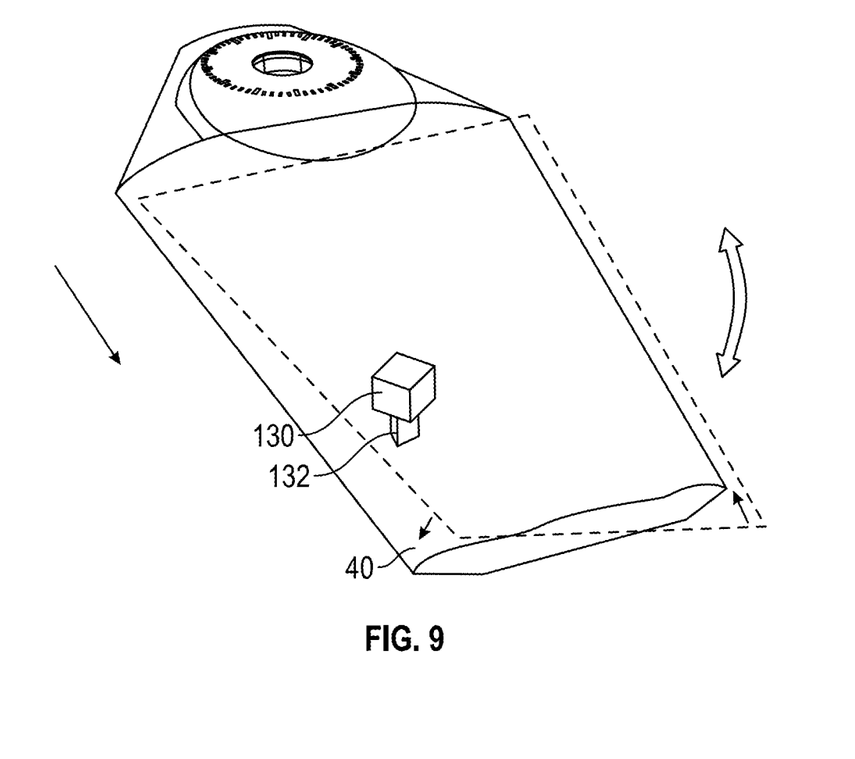
FIG. 9 is a top perspective view of another embodiment of a blade of a blade assembly of the present invention.

Referring now to FIG. 9, this embodiment depicts a blade 40 that warps based on a centrifugal weight 130 connected to a leverage stalk 132. When a centrifugal force pulls on the centrifugal weight 130, offset by the leverage stalk 132, a torsional affect warps the blade 40 when counteracted by centripetal force exerted by the offset body of the blade 40. This occurs when the automobile 24 goes faster, and the increasing centrifugal force acting on the weight 130, following the circular path of the inner rim 28, is overcome gradually with increases in RPM's. This causes a gradual increasing of warping angle of the blade 40 as depicted by the dotted line.

Figure 10:
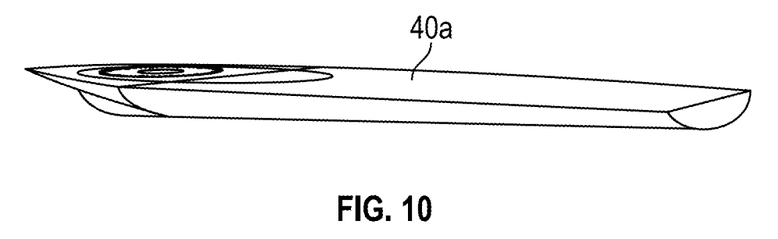
FIG. 10 is a side view of an embodiment of a blade of a blade assembly of the present invention.
Figure 11:
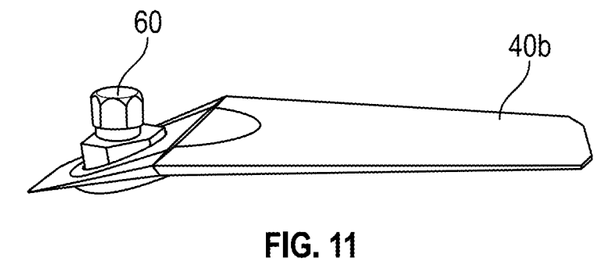
FIG. 11 is a side view of another embodiment of a blade of a blade assembly of the present invention.
Figure 12:
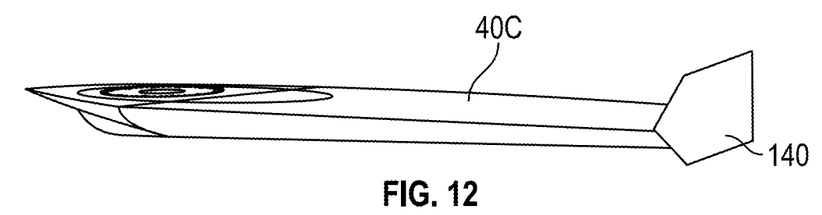
FIG. 12 is a side view of another embodiment of a blade of a blade assembly of the present invention.

FIGS. 10-12 depict different blade 40 arrangements. FIG. 10 depicts a blade 40a having a substantially flat airfoil shape. FIG. 11 depicts a blade 40b having a joint. FIG. 12 depicts a blade 40c having wingtip device 140. A wingtip device 140 can help eliminate drag and vortices.

Figure 13:
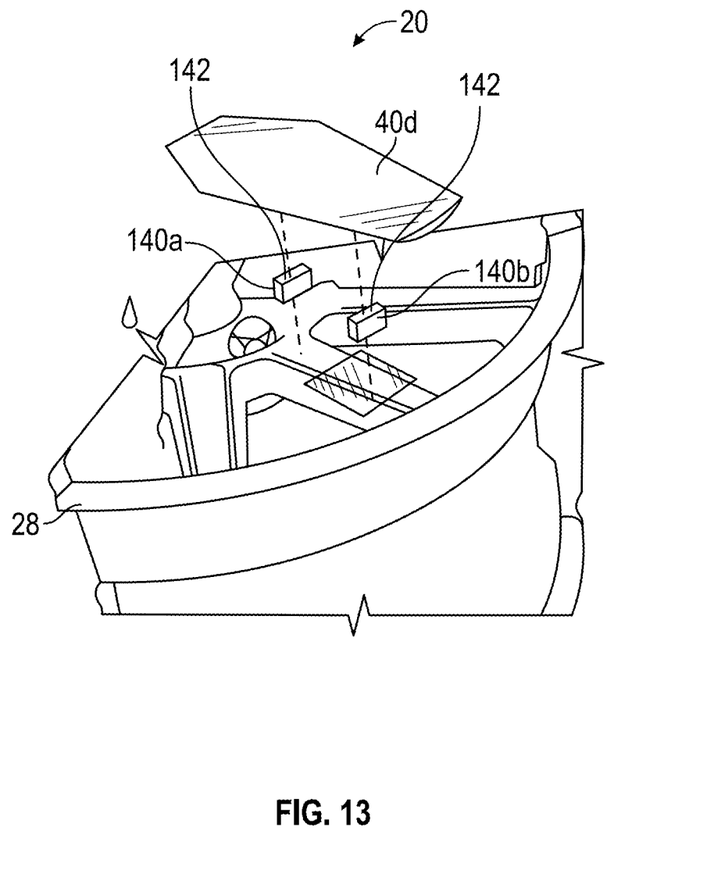
FIG. 13 is an exploded view of another embodiment of a connection of a blade assembly of the present invention to the automobile wheel.

FIG. 13 depicts an embodiment of the present invention where the blade assembly 20 is adhered directly to the outer surface of the rim spokes 32 using an adhesive glue 142. One or more spacer blocks 140a, 140b are used to separate the blade 40d from the spoke 32 to improve aerodynamic properties. The spacer blocks 140a, 140b are, in this embodiment, adhered directly to any surface of the rim 28.

Although certain embodiments and features of a vehicle wheel blade assembly have been described herein, the scope of coverage of this patent is not limited thereto. On the contrary, this patent covers all embodiments of the teachings of the disclosure that fairly fall within the scope of permissible equivalents.

What is claimed is:

1. A blade assembly for connection to a vehicle wheel having an individual lug nut bolt, comprising:
    a single aerodynamic blade; and
    a connection assembly, which includes a fastening bolt, at least one beveled washer and an open-ended lug nut having two opposing ends, wherein the connection assembly connects the single aerodynamic blade to the individual lug nut bolt of the vehicle wheel.

2. A plurality of blade assemblies for connection to a corresponding plurality of lug nut bolts of a vehicle wheel, wherein each blade assembly comprises:
    a blade defining a hole;
    a connection assembly, including a fastening bolt, at least one beveled washer and an open-ended lug nut having two opposing ends;
    wherein, in use, one end of the open-ended lug nut is fastened to a lug nut bolt of the vehicle wheel; and
    wherein the fastening bolt passes through the at least one beveled washer and the hole in the blade and engages the opposing end of the open-ended lug nut to fasten the blade to the vehicle wheel.

3. The plurality of blade assemblies of claim 2, wherein each blade includes a plateau formed thereon to disperse compressive forces.

4. The plurality of blade assemblies of claim 2, wherein the at least one beveled washer is adjusted for each blade to set each blade at an individual desired angle.

5. The plurality of blade assemblies of claim 2, wherein each blade further comprises:
    a blade portion;
    a hinge;
    an aileron,
    a mechanical servo;
    a pushrod;
    a linkage, wherein the blade portion is hinged to the aileron and the mechanical servo is connected to the blade portion and the linkage is connected to the aileron; and
    wherein the mechanical servo is connected to the linkage to move the aileron relative to the blade portion when the mechanical servo is activated.

6. The plurality of blade assemblies of claim 2, wherein each blade further comprises:
    a blade portion;
    an anchor portion defining the hole;
    a servo connected to the anchor;
    a gear set connected to the anchor and the servo; and
    a rotational column connected to and extending from the gear set into the blade portion;
    wherein when the servo is activated, the servo moves the gear set, which rotates the blade portion.

7. The plurality of blade assemblies of claim 2, wherein each blade includes a leverage stalk and a centrifugal weight connected thereto.

8. The plurality of blade assemblies of claim 2, wherein each blade includes a joint.

9. The plurality of blade assemblies of claim 2, wherein each blade includes a wingtip device.

10. A plurality of blade assemblies for connection to a corresponding plurality of lug nut bolts of a vehicle wheel, wherein each blade assembly comprises:
    a blade defining a hole;
    a connection assembly, including a fastening bolt, a pair of adjustable beveled washers, a plurality of flat washers and an open-ended lug nut having two opposing ends;
    wherein, in use, one end of the open-ended lug nut is fastened to a lug nut bolt of the vehicle wheel; and
    wherein the fastening bolt passes through a first beveled washer of the pair, the hole in the blade, the second beveled washer of the pair, the plurality of flat washers and engages the opposing end of the open-ended lug nut to fasten the blade to the vehicle wheel.

11. The plurality of blade assemblies of claim 10, wherein each blade includes a plateau formed thereon to disperse compressive forces.

12. The plurality of blade assemblies of claim 10, wherein the pair of adjustable beveled washers are adjusted for each blade to set each blade at an individual desired angle.

\* \* \* \* \*